Patented Sept. 25, 1934

1,974,799

UNITED STATES PATENT OFFICE 1,974,799

OLEORESINOUS COATING COMPOSITION

Lewis D. Gittings, Anniston, Ala., assignor to Swann Research, Incorporated, a corporation of Alabama No Drawing. Application February 1, 1933, Serial No. 654,765

2 Claims. (Cl. 134—39)

This invention relates to a new pigmented composition and specifically to a new coating composition made therefrom.

One object of this invention is to provide a pigmented composition in which opacity and hiding power is obtained by means of a chemically inert, non-livering, light-resistant body.

Well known means for producing opacity and hiding power in coating compositions of the paint and varnish type consist in the addition of the known inorganic pigments such as zinc oxide, titanium oxide, lithopone, basic lead carbonate, etc. These pigments, being inorganic in nature, dissolve usually to a very slight degree, resulting in the production of ions in solution due to hydrolysis of the dissolved substance. In many cases the dissolved substance results in the formation of ions, one type of which may be stronger than the other, and consequently may result in the precipitation of colloidal matter in the coating composition. The livering of drying oil compositions by basic pigments is apparently an effect of this nature.

Even if the pigment as prepared is neutral, the action of sunlight, air and moisture during exposure alters the pigment in the coating to a greater or less degree, often causing accelerated failure.

This application is a continuation in part of application Ser. No. 595,959, filed Feb. 29, 1932.

In experiments to overcome these difficulties with the white pigments, I have discovered that if a crystalline or chlorinated or brominated diphenyl be finely divided, it may be incorporated in the ordinary paint or lacquer vehicle and highly resistant pigmented or opaque coating compositions obtained. A chlorinated diphenyl having more than 68 percent chlorine, and preferably in the neighborhood of 69 or more percent chlorine, is suitable for the purpose, although other chlorinated or brominated diphenyls may be employed, provided they possess a crystalline, as distinguished from a resinous, structure. The preferred type of chlorinated diphenyl has an average composition corresponding to the formula:—$C_{12}HCl_9$.

Such a chlorinated diphenyl useful in my improved product may be conveniently prepared by reacting directly on diphenyl with chlorine gas using a chlorination catalyst such as iron. The material, after having been chlorinated to a chlorine content in the neighborhood of 69%, is distilled either in a vacuum still or under atmospheric pressure. The product thus obtained consists of a yellow to white dense crystalline solid having an approximate chemical composition represented by the formula $C_{12}HCl_9$; a specific gravity of 1.9, and an average refractive index of 1.72. It is practically insoluble in cold benzol and only moderately soluble in hot benzol.

Brominated diphenyl suitable for my purpose is made in similar manner to the above, bromination being continued until the product contains between, say, 82 and 84 percent of bromine. Such a product has a specific gravity of 3.02, a refractive index of 1.82, and a chemical composition varying between and including that expressed by the formulæ:—$C_{12}H_3Br_7$ and $C_{12}H_2Br_8$.

In analogous manner to the chlorinated diphenyls, I may employ brominated diphenyls having a different constitution from that expressed above, provided such material has a crystalline, as distinguished from a resinous, structure.

In order to more readily understand my invention, it is desirable that a distinction be drawn between various types of halogenated diphenyl. The type of chlorinated diphenyl which is resinous contains somewhat less chlorine, usually up to 60 or 65% by weight of chlorine, and may contain other chlorinated diaryls admixed therewith; while my pigmented composition contains a chlorinated diphenyl with upwards of 67 or 68% or more percent of chlorine. This small difference in chlorine content causes a great difference in behavior and properties. The lower chlorinated resinous product is useful because of its compatibility with ordinary oleoresinous varnish liquids. (See Gardner British Pat. 351,637.) The higher chlorinated or brominated diphenyl pigment is not compatible with such oleoresinous liquids and, in fact, is insoluble in all the ordinary varnish solvents. This fact has enabled me to prepare the pigmented oleoresinous compositions described below.

The improved pigment above described may be employed in various ways for the production of pigmented oleoresinous compositions, as described in the following example below:—

Example

The pigment which is herein employed is a chlorinated diphenyl of, say, 69% chlorine content. It may be incorporated by grinding in ordinary linseed or tung oil by known means. Covering power will depend upon the amount of pigment employed, usually equal parts by weight of pigment and oil being satisfactory, although this proportion may be varied as necessary. If desired, other pigments may be employed together with chlorinated or brominated diphenyl or with a mixture of these. When combined with other pigments, the following formula will be found satisfactory for general purposes:—

16.0 ozs. lead carbonate (Dutch process)
12.8 ozs. zinc oxide
3.2 ozs. chlorinated diphenyl pigment (69% chlorine)
13.5 fluid ozs. linseed oil.

If desired, in place of the linseed oil used in the above formula, a varnish containing resinous chlorinated diphenyl (40 to 60% chlorine) may be used (Gardner Brit. Pat. 351,637).

I may also employ other halogenated diphenyls such as the corresponding crystalline highly fluorinated or iodinated diphenyls. However, because of the higher cost of such products, they are not as readily obtained as the chlorinated or brominated diphenyls. I may also employ mixed halogenated diphenyl, by which I comprehend not only physical mixtures of these compounds but also compounds in which the diphenyl nucleus contains more than one kind of halogen atom.

My pigmented compositions are particularly useful for the production of fireproof paints.

Other modifications and changes will occur to one skilled in the art, and I desire that only such limitations be placed upon my invention as may be imposed by the prior art or as are specifically set forth in the appended claims.

What I claim is:—

1. An oleoresinous coating composition containing a vehicle and a pigment, said pigment comprising a chlorinated diphenyl having approximately the chemical formula: $C_{12}HCl_9$.

2. An oleoresinous coating composition containing a vehicle and a pigment, said pigment consisting of a chlorinated diphenyl having approximately the chemical formula: $C_{12}HCl_9$.

LEWIS D. GITTINGS.